Figure 1:
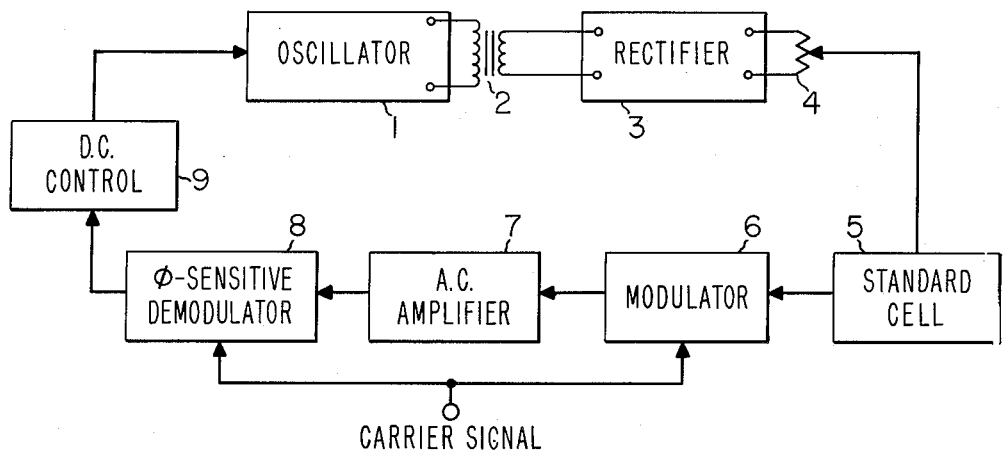

Dec. 27, 1955   G. F. ZIFFER   2,728,858
REGULATED POWER SUPPLY
Filed Oct. 26, 1953

INVENTOR
*GARRET F. ZIFFER*
BY
*Spencer E. Olson*
ATTORNEY

United States Patent Office 2,728,858
Patented Dec. 27, 1955

2,728,858

REGULATED POWER SUPPLY

Garret F. Ziffer, Cambridge, Mass., assignor to Tracerlab, Inc., Boston, Mass., a corporation of Massachusetts Application October 26, 1953, Serial No. 388,369

12 Claims. (Cl. 250—36)

This invention relates to a regulated electronic power supply characterized by long term stability.

In many applications of electronic equipment it is necessary to provide a highly regulated voltage, as for example as a comparison voltage in bridge or potentiometer systems for accurately measuring a sample voltage where the measurement accuracy is no better than the reference. Another application is in the replacement of batteries in amplifiers where amplifier stability is critical. Conventional batteries ordinarily are not suitable as a reference voltage in a bridge circuit since the natural voltage drop of the battery when subjected to its rated current drain is sufficient to cause objectionable drift. Standard cells are suitable as a reference voltage in certain applications, but they are limited in their usefulness in that they cannot deliver an appreciable current, and frequently the voltage to be measured is of a different order of magnitude than the voltage of the standard cell, making comparison difficult.

Regulated power supplies of various designs have been extensively used in the art, but each of the present known techniques have shortcomings which make them unacceptable where extreme stability is needed. The basic elements of most regulator circuits are an unregulated power supply, a serially connected control tube or voltage dropping tube, a voltage divider network connected across the output terminals, an amplifier connected to receive a voltage signal from the voltage divider together with a voltage from a voltage reference and to amplify the algebraic sum of these signals, and means for feeding this amplified difference to the control tube which determines the regulated output voltage. In regulators of this type, the load is in series with the regulating or control tube, and accordingly the total load current has to go through the regulator. At low regulated voltages, say 1 to 3 volts, the current through the regulator is necessarily high, and the series regulator must be large in order to carry it. It is therefore desirable to provide a regulator circuit wherein the current from the primary voltage supply is relatively low, even at low voltages, to permit the use of a small regulator tube, and to take advantage of the fact that better regulation is obtainable with voltage regulator tubes when the current therethrough is small, say of the order of 20 milliamperes.

The present invention contemplates a power supply in which only a fraction of the output load current is supplied from the primary source of power thus allowing the use of simple regulating means in the primary source. In particular, the present circuit is arranged to provide current amplification so that the power supplied to the circuit from the primary source can be delivered at relatively low current. While some regulation of the primary source is desirable, the current requirements are such that such regulation may be adequately achieved by a simple voltage regulator tube. More particularly, the present invention contemplates a power supply comprising the combination of an oscillator energized by a roughly regulated voltage and adapted to have the amplitude of its output controlled in response to an electrical signal, a rectifier transformer-coupled to the oscillator, and a load resistor connected across the rectifier. A selected portion of the voltage appearing across the load resistor is bucked out by a source of reference voltage, and any resulting error signal is modulated, amplified by an alternating current amplifier, and then demodulated by a phase-sensitive demodulator. The demodulated signal is amplified by a direct current amplifier and applied to a control element of the oscillator to adjust the amplitude of the output thereof in a direction to reduce the error signal to zero. The use of an alternating current amplifier in the regulating loop does not contribute any drift and hence has no effect on the stability of the supply.

Figure 2:
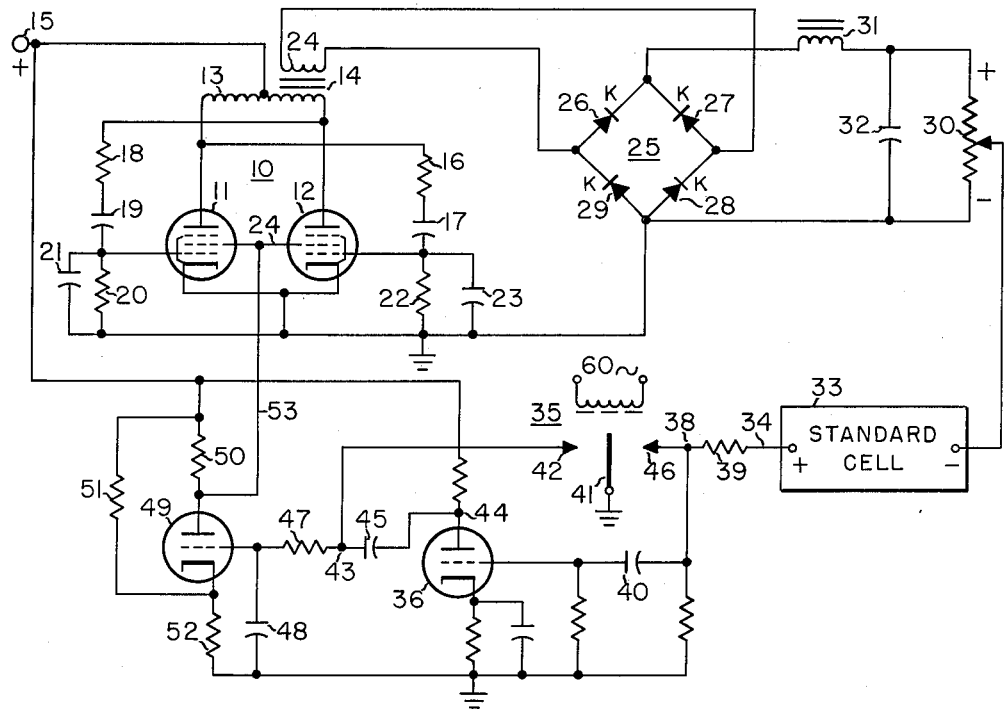

Other features and advantages of the invention will become apparent from the following detailed description thereof taken in conjunction with the accompanying drawing in which:

Fig. 1 is a schematic diagram, principally in block diagram form, illustrating one form of the circuit of the invention; and Fig. 2 is a detailed wiring diagram of a preferred embodiment of the invention.

Referring to Fig. 1, the power supply of the present invention has as its primary source of voltage an oscillator 1 energized from an external direct current source which is preferably regulated to a certain extent for optimum operation of the present circuit. Oscillator 1 may be of any one of several available forms and includes a control element responsive to an electrical signal for adjusting the amplitude of the output oscillations. The output of the oscillator is coupled by step-down transformer 2 (affording a step-up of current) to a suitable rectifier 3, which may be of the half- or full-wave type, the resulting direct current voltage being developed across load resistor 4. A selected portion of the voltage appearing across resistor 4 is bucked out by a source of reference voltage, for example, a standard cell 5, thus producing a direct error signal when the voltage across resistor 4 deviates from the desired value. The error signal is converted to a periodic signal by a suitable modulator 6, such as a vibrating reed, a chopper, or the like, and the output thereof is coupled to an alternating current amplifier 7, including one or more stages of amplification. The output of amplifier 7 is demodulated in a phase-sensitive demodulator 8 to convert it back to direct current. The demodulator 8 is synchronized with modulator 6 at the frequency of a carrier signal applied in phase to the two componets, which may be, for example, a 60 cycle signal. The direct current output of the demodulator is applied to a control element 9 associated with oscillator 1, which is effective to control the amplitude of the output of the oscillator in response to the output of the demodulator. Control element 9 may take a variety of forms, depending on the nature of the oscillator employed. The modulator, amplifier and demodulator are so phased, and the control element 9 is so arranged that the control signal varies the amplitude of the output of oscillator 10 in a direction to reduce the error signal to zero.

Fig. 2 shows a preferred form of the circuit of Fig. 1 in detail and includes as the primary source of voltage, an oscillator 10, illustrated by way of example as a modified push-pull Wien-bridge oscillator. An oscillator of the type indicated is particularly suited in the present circuit because of the convenient controlability of the amplitude of its output signal, but it is to be understood that any oscillator adapted for similar control may be used in the system without departing from the spirit of the invention. In detail, the oscillator comprises two electron tubes 11 and 12, preferably pentodes, having their cathodes connected together and their anodes also connected together via the primary winding 13 of transformer 14. The oscillator is energized from the positive terminal 15 of a regulated power supply, which may be of a value of +300 volts, connected to the center tap of winding 13, the cathodes of the tubes being connected to the negative terminal, here illustrated as ground. The anode of tube 11 is cross-connected to the control grid of tube 12 through a series combination of resistor 16 and capacitor 17, and the anode of tube 12 is similarly connected to the control grid of tube 11 through the series combination of resistor 18 and capacitor 19. The control grid of tube 11 is additionally connected to ground by the parallel combination of resistor 20 and capacitor 21, and the control grid of tube 12 is similarly connected to ground by resistor 22 and capacitor 23. The suppressor grid of each tube is connected to its respective cathode, and the screen grids of the tubes are connected together, as by connection 24, and are supplied with a control signal in a manner to be described hereinafter. The frequency of the oscillator is determined by the values of resistors 16, 18, 20 and 22 and capacitors 17, 19, 21 and 23, all resistors and all capacitors being of the same value, and chosen to give a frequency in the audio range. The output of the oscillator is a periodic signal of generally square wave form having an amplitude primarily dependent on the value of the voltage applied to the screen grids of tubes 11 and 12.

The output of oscillator 10 is coupled by the secondary winding 24 of transformer 14, with a step-down in voltage, to a suitable rectifier 25, which may be of the bridge type, comprising unidirectional conducting devices 26, 27, 28 and 29, connected to provide full-wave rectification of the signal. The output of rectifier 25 is applied to load resistor 30 through a choke 31, to remove ripple, further smoothing action being obtained by capacitor 32. Accordingly, there appears across resistor 30 a direct current voltage, of the polarity indicated, and of a magnitude determined by the parameters of the oscillator.

To obtain regulation of the voltage developed across resistor 30, a portion thereof is compared with the voltage of a standard cell 33, the movable tap on resistor 30 being adjusted to a point such that when the desired voltage appears across resistor 30, zero voltage relative to a point of reference voltage, here illustrated as ground, appears at point 34. Thus, as the voltage across resistor 30 exceeds or falls below the desired value, point 34 becomes positive and negative, respectively, relative to the point of reference. To achieve amplification of the deviations of point 34 without using direct current amplifiers (which are generally regarded as having objectionable drift), the direct current signal is modulated by a contact-type modulator, amplified by an A. C. amplifier, and again demodulated. As distinguished from the general circuit of Fig. 1 which illustrates the modulator and demodulator as being separate components, a single chopper 35 is combined with an amplifier 36 in such a fashion that it performs both the modulation and demodulation function. While a single stage 36 of A. C. amplification is illustrated it will be understood that additional stages may be used without altering the operation of the circuit or departing from the spirit of the invention.

To describe how modulation and synchronous demodulation is accomplished with a single vibrator, assume that a positive voltage exists at point 34 (corresponding to a voltage across resistor 30 in excess of the desired value), with the vibrator 35 in operation to connect point 38 (separated from point 34 by current-limiting resistor 39) to a point of reference potential (ground) at a predetermined rate, say 60 times a second. Therefore, a rectangular voltage wave having a repetition rate of 60 cycles/sec. and a magnitude equal to the voltage at point 34 appears at point 38 and is impressed on the control grid of tube 36 via condenser 40. With the contactor 41 of the vibrator in the left position in contact with contact 42, point 43 is grounded and the positive-going portion of the square wave is applied to amplifier 36, resulting in point 44 going negative with respect to its quiescent value. With condenser 45 charged in this manner, contactor 41 breaks contact with contact 42 and swings to make contact with contact 46, thereby causing the input signal to amplifier 36 to go down and point 44 to go up with respect to its quiescent value. Since the condenser cannot instantaneously change its charge, point 43 also goes up, whereby a square wave 180° out of phase with the input signal and clamped at the reference potential appears at point 43. The average value of the resultant square wave is positive and larger than the voltage at point 38 by a factor equal to half the gain of the amplifier 36. This signal is applied to a filter comprising resistor 47 and condenser 48 to remove the alternating current component, and the direct current component applied to direct current amplifier 49.

Amplifier 49 is energized from regulated voltage supply 15 through resistor 50 to minimize drift in the amplifier and to insure that voltage changes at the anode of tube 49 are due only to changes in the signal applied to its control grid. The cathode of tube 49 is maintained at a positive voltage by a voltage divider comprising resistors 51 and 52 connected across the energizing power supply, the cathode being connected to the junction thereof, the resistors being of a value to transfer control signals from the anode of tube 49 to the screen grids of tubes 11 and 12 via connection 53 at the proper voltage level. As the potential on the grid of tube 49 is increased, the potential at the anode decreases, this change being applied to the screen grids of tubes 11 and 12 to reduce the amplitude of the output of the oscillator. This reduction in amplitude, in turn, reduces the voltage across resistor 30 to the desired value and the signal at point 34 to zero.

When point 34 is negative with respect to ground, a square wave 180° out of phase with the one produced when point 34 is positive is produced at point 43, and is clamped at zero at its upper limit whereby its average value is negative. The application of this negative signal to the D. C. amplifier causes an increase in the voltage applied to the screen grids of the tubes of oscillator 10 and an increase in the output voltage to an extent to again bring point 34 to zero potential.

Reviewing the operation of the circuit, oscillator 10 provides a periodic output signal which is stepped down in voltage by transformer 14 and coupled to rectifier 25, which develops a direct current voltage across resistor 30. A transformer being a power conserving device, the current through resistor 30 is larger than the current supplied to the oscillator from source 15 by a factor equal to the transformer ratio. Thus, voltage source 15 can be regulated with a relatively low current voltage regulator, for example, a simple, inexpensive voltage regulator tube, and yet be sufficiently stable to insure stable operation of the present circuit. A portion of the voltage developed across resistor 30 is compared with the voltage of standard cell 33, the movable tap on resistor 30 being adjusted to such a point that when the desired voltage appears across resistor 30, point 34 is at zero voltage relative to a selected reference potential. If the voltage across resistor 30 increases beyond the desired value, point 34 becomes positive, and contactor 35 and amplifier 36 through modulation, amplification and demodulation of the signal produce a signal at point 43 the average value of which is positive and larger than the voltage at point 34 by a factor equal to half the gain of amplifier 36. This signal is filtered, amplified further by direct current amplifier 49, and applied to the screen grids of tubes 11 and 12 of oscillator 10, decreasing the voltage thereon and consequently reducing the amplitude of the output oscillations. This reduction in amplitude has the effect of reducing the voltage across resistor 30, and point 34 is returned to zero potential.

Conversely, if the voltage across resistor 30 falls below the desired value, point 34 becomes negative, vibrator 41 and amplifier 36 produce a signal at point 43 having a negative average value, which after filtering and amplification by direct current amplifier 49 raises the voltage on the screen grids of tubes 10 and 11 thereby increasing the amplitude of the output oscillations. This increase in amplitude raises the voltage across resistor 30 and point 34 is brought back to zero potential.

Thus, any tendency of the potential across resistor 30 to depart from the desired value is amplified by the regulatory loop including vibrator 35, alternating current amplifier 36 and direct current amplifier 49 and applied to the screen grids of oscillator tubes 10 and 11 in a direction to oppose the tendency, thus maintaining the potential across resistor 30 essentially constant. A circuit constructed in accordance with the foregoing description demonstrates a long term stability of less than .01%.

While there have been shown and described and pointed out the novel features of the invention as applied to a preferred embodiment, it will be understood that various omissions and substitutions and changes in form may be made by those skilled in the art without departing from the spirit of the invention. It is the intention, therefore, to be limited only as indicated by the scope of the appended claims.

What is claimed is:

1. A regulated power supply comprising, in combination, a source of oscillations including a control element for adjusting the amplitude of the output oscillations, means coupled to said source for rectifying said oscillations, an output resistor connected across said rectifying means, a reference voltage source connected to said output resistor to buck the voltage tapped from said resistor and provide an error signal when the voltage across said resistor deviates from the desired value, means for modulating said error signal to produce a periodic signal, means for amplifying said periodic signal, means synchronously driven with said modulating means for demodulating the output of said amplifier, and means connecting said demodulating means to the control element of said source of oscillations.

2. A regulated power supply comprising, in combination, an oscillator including a control element for adjusting the amplitude of the output thereof in response to an electrical signal, a rectifier, a load resistor connected across said rectifier, means including a step-down transformer coupling the output of said oscillator to said rectifier, a source of reference voltage connected to a tap on said load resistor to buck out the voltage tapped from said load resistor, an alternating current amplifier having input and output terminals, means connected between said source of reference voltage and the input terminal of said amplifier for modulating any direct current error signal existing between said reference voltage and said voltage tapped from said load resistor and means synchronously driven with said modulating means connected between the output terminal of said amplifier and the control element of said oscillator for demodulating the output of said amplifier and applying a direct current signal to said control element in a direction to reduce said error signal to zero.

3. A regulated power supply comprising, in combination, a source of oscillations, a rectifier, means including a step-down transformer coupling the output of said oscillator to said rectifier, a load resistor connected across said rectifier, a source of reference voltage connected to a tap on said load resistor to buck out the voltage tapped from said load resistor, an alternating current amplifier having input and output terminals, means connected between said source of reference voltage and the input terminal of said amplifier for modulating any direct current error signal existing between said reference voltage source and said voltage tapped from said load resistor, means connected to the output terminal of said amplifier and synchronously driven with said modulating means for demodulating the output of said amplifier to produce a control signal, and means responsive to said control signal for adjusting the amplitude of the oscillations applied to said rectifier.

4. A regulated power supply comprising, in combination, an oscillator, a rectifier, means including a step-down transformer coupling the output of said oscillator to said rectifier, a load resistor connected across said rectifier, a source of reference voltage, means for modulating any difference in voltage between a portion of the voltage appearing across said load resistor and said reference voltage, an alternating current amplifier having an input terminal connected to said modulating means, phase-sensitive demodulating means connected to the output of said amplifier, for demodulating the output of said amplifier to produce a direct current control signal, and means responsive to said signal for adjusting the amplitude of the oscillations applied to said rectifier.

5. A regulated power supply comprising, in combination, an oscillator including a control element for controlling the amplitude of the output thereof in response to an electrical signal, a rectifier, means including a step-down transformer coupling the output of said oscillator to said rectifier, a load resistor connected across said rectifier, a source of reference voltage connected to a point on said load resistor to buck out the voltage tapped from said load resistor, an alternating current amplifier, a modulator connected between said source of reference voltage and the amplifier input, and a phase-sensitive demodulator connected between the output of said amplifier and the control element of said oscillator.

6. A regulated power supply comprising, in combination, an oscillator including a control element for adjusting the amplitude of the output thereof in response to a direct current signal, a rectifier, means including a step-down transformer coupling the output of said oscillator to said rectifier, a load resistor connected across said rectifier, a source of reference voltage, a contact type modulator arranged to modulate any difference in potential existing between said reference voltage and a selected portion of the voltage across said load resistor, an alternating current amplifier having input and output terminals, means connecting said modulator to the input terminal of said amplifier, and a contact type demodulator synchronously driven with said modulator connected between the output terminal of said amplifier and the control element of said oscillator.

7. A regulated power supply comprising, in combination, an oscillator including a control element for controlling the amplitude of the output thereof in response to an electrical signal, a rectifier, means including a step-down transformer coupling the output of said oscillator to said rectifier, a load resistor connected across said rectifier, a source of reference voltage connected to a point on said load resistor to buck out the voltage tapped from said load resistor, an alternating current amplifier, a contact type modulator connected between said source of reference voltage and the amplifier input, and a phase-sensitive contact type demodulator connected between the output of said amplifier and the control element of said oscillator, and means driving the modulator and demodulator synchronously.

8. A regulated power supply comprising, in combination, an oscillator including a control element for controlling the amplitude of the output thereof in response to an electrical signal, a rectifier, means including a step-down transformer coupling the output of said oscillator to said rectifier, a load resistor connected across said rectifier, a source of reference voltage connected to a point on said load resistor to buck out the voltage tapped from said load resistor, an alternating current amplifier, a modulator connected between said source of reference voltage and the amplifier input, a phase-sensitive contact type demodulator connected to the output of said amplifier, a direct current amplifier connected between the output of said demodulator and the control element of said oscillator, and means driving the modulator and demodulator synchronously.

9. A regulated power supply comprising, in combination, an oscillator including control means for controlling the amplitude of the output thereof, a rectifier transformer coupled to said oscillator, an output load resistor connected across said rectifier, an alternating current amplifier having input and output terminals, a contact type modulator connected between the input and output terminals of said amplifier, a reference voltage source connected between the input terminal of said amplifier and a tap on said output load resistor to buck out the voltage tapped from said load resistor, and a direct current amplifier connected between the output terminal of said alternating current amplifier and the control means of said oscillator.

10. A regulated power supply comprising, in combination, an oscillator including a control element for adjusting the amplitude of the output thereof, a rectifier, means including a step-down transformer coupling said oscillator to said rectifier, an output load resistor connected across said rectifier, an alternating current amplifier having input and output terminals, a capacitor having one plate connected to the output terminal of said alternating current amplifier, a contact type modulator having its contacts respectively connected to the input terminal of said alternating current amplifier and the other plate of said capacitor, means driving said modulator at a predetermined rate, a reference voltage source connected between the input terminal of said alternating current amplifier and a tap on said load resistor to buck out the voltage tapped from said load resistor, a filter connected to said other plate of said capacitor, and a direct current amplifier connected between said filter and said control means of said oscillator.

11. A regulated power supply comprising, in combination, an oscillator including a control element for controlling the amplitude of the output thereof in response to an electrical signal, a rectifier, means including a step-down transformer connecting said oscillator to said rectifier, an output load resistor connected across said rectifier, an alternating current amplifier having input and output terminals, a vibrator having first and second contacts and a contactor adapted to be driven at a predetermined rate, means connecting said first contact to the input terminal of said amplifier, means including a capacitor connecting said second contact to the output terminal of said amplifier, a reference voltage source connected between the input terminal of said amplifier and a tap on said load resistor to buck out the voltage tapped from said load resistor, said vibrator and amplifier being so phased as to modulate, amplify and demodulate any error signal appearing at the input terminal of said amplifier, and a direct current amplifier connected between said capacitor and the control element of said oscillator.

12. A regulated power supply comprising, in combination, an oscillator including a control element for adjusting the amplitude of the output thereof in response to an electrical signal, a rectifier, means including a step-down transformer connecting said oscillator to said rectifier, an output load resistor connected across said rectifier, an alternating current amplifier having input and output terminals, a vibrator having first and second contacts and a contactor, means driving said contactor at a predetermined rate, means connecting said first contact to the input terminal of said amplifier, means including a capacitor connecting said second contact to the output terminal of said amplifier, a reference voltage source connected between the input terminal of said amplifier and a tap on said load resistor to buck out the voltage tapped from said load resistor whereby an error signal appears at the input terminal of said amplifier when the voltage across said load resistor deviates from a desired value, said vibrator and amplifier being so phased as to modulate, amplify and demodulate said error signal to produce an output signal having a direct current component of the same polarity as said error signal, means for filtering said output signal, and a direct current amplifier connected between said filtering means and the control element of said oscillator for applying a signal to said control element in a direction to adjust the amplitude of the output thereof so as to reduce said error signal toward zero.

References Cited in the file of this patent

UNITED STATES PATENTS

| | | |
|---|---|---|
| 2,103,619 | Hallmark | Dec. 28, 1937 |
| 2,594,572 | Lupo | Apr. 29, 1952 |